(12) United States Patent
Hayashi et al.

(10) Patent No.: US 10,140,676 B2
(45) Date of Patent: Nov. 27, 2018

(54) OPERATION ADVANCE INDICATION APPARATUS

(71) Applicants: NIPPON SOKEN, INC., Nishio, Aichi-pref. (JP); DENSO CORPORATION, Kariya, Aichi-pref. (JP)

(72) Inventors: Rina Hayashi, Nishio (JP); Toshiki Isogai, Nishio (JP)

(73) Assignees: SOKEN, INC., Nisshin, Aichi-pref. (JP); DENSO CORPORATION, Kariya, Aichi-pref. (JP)

( * ) Notice: Subject to any disclaimer, the term of this patent is extended or adjusted under 35 U.S.C. 154(b) by 37 days.

(21) Appl. No.: 15/352,709

(22) Filed: Nov. 16, 2016

(65) Prior Publication Data

US 2017/0140491 A1 May 18, 2017

(30) Foreign Application Priority Data

Nov. 18, 2015 (JP) ................................. 2015-225866

(51) Int. Cl.
| | |
|---|---|
| *G06K 9/00* | (2006.01) |
| *G06T 1/00* | (2006.01) |
| *G10L 13/02* | (2013.01) |
| *B25J 9/16* | (2006.01) |
| *G05B 19/00* | (2006.01) |
| *G06F 3/01* | (2006.01) |

(52) U.S. Cl.
CPC ........... *G06T 1/0014* (2013.01); *B25J 9/1694* (2013.01); *G05B 19/00* (2013.01); *G06K 9/00362* (2013.01); *G06K 9/00664* (2013.01); *G10L 13/02* (2013.01); *G06F 3/013* (2013.01)

(58) Field of Classification Search
CPC ... G06T 1/0014; G05B 19/00; G06K 9/00362
USPC ......................................................... 382/153
See application file for complete search history.

(56) References Cited

U.S. PATENT DOCUMENTS

| | | | | |
|---|---|---|---|---|
| 2010/0082196 A1* | 4/2010 | Sekiya | ................. | G05D 1/0246 701/26 |
| 2012/0290132 A1* | 11/2012 | Kokubo | ................. | B25J 9/1666 700/255 |
| 2014/0067121 A1* | 3/2014 | Brooks | ................. | B25J 9/1676 700/255 |

(Continued)

FOREIGN PATENT DOCUMENTS

JP 2004-122313 A 4/2004

*Primary Examiner* — Raj Chakraborty
(74) *Attorney, Agent, or Firm* — Harness, Dickey & Pierce, P.L.C.

(57) ABSTRACT

An advance indication part performs an advance indication of operation of a robot by using a movable part in correspondence to an operation program or a command supplied to the robot. When the advance indication part performs the advance indication, a user detection part detects a user in a predetermined area of movement of the movable part based on a picture image taken by a camera. When the user detection part detects the user, a recognition check part checks whether the detected user has recognized the advance indication of the advance indication part. When the recognition check part determines that the detected user has not recognized the advance indication yet, a recognition promotion part promotes the detected user to recognize the advance indication or an operation of the robot.

4 Claims, 7 Drawing Sheets

(56) References Cited

U.S. PATENT DOCUMENTS

2014/0337024 A1* 11/2014 Zuo .................... G10L 15/1822
            704/239
2016/0077526 A1* 3/2016 Sisbot ................... A61H 3/061
            701/23

* cited by examiner

OPERATION ADVANCE INDICATION APPARATUS

CROSS REFERENCE TO RELATED APPLICATION

The present application is based on Japanese patent application No. 2015-225866 filed on Nov. 18, 2015, the whole contents of which are incorporated herein by reference.

FIELD

The present disclosure relates to an operation advance indication apparatus, which is provided on a robot having a movable part to make an advance indication of an operation of the robot.

BACKGROUND

It is proposed conventionally to attach an image projection device on a wrist of a manipulator for projection light onto an object, on which the manipulator will operate next (JP 2004-122313A). A user is thus enabled to realize the object, on which the manipulator will operate next, by the projected light.

In some instances, the user does not recognize the projected light, that is, the user is not aware of the projected light at all. When the user is not aware of the projected light, the user will recognize movement of manipulator only after the manipulator has moved very closely to a body of the user.

SUMMARY

It is therefore an object to provide an operation advance indication apparatus, which is provided on a robot having a movable part and capable of causing a user to recognize an operation of the robot in advance.

According to one aspect, an operation advance indication apparatus attached to a robot, which has a movable part, indicates an operation of the robot. The operation advance indication apparatus comprises an advance indication part, a user detection part, a recognition check part and a recognition promotion part. The advance indication part indicates an operation of a robot in advance. The user detection part detects a user present inside a predetermined area, in which the movable part moves to perform the operation. The recognition check part checks whether a detected user has recognized the advance indication, when the user detection part has detected the user. The recognition promotion part promotes a recognition of the detected user about the advance indication or about the operation of the robot, when the recognition check part determines that the detected user has not recognized the advance indication.

EMBODIMENT

Figure 1:
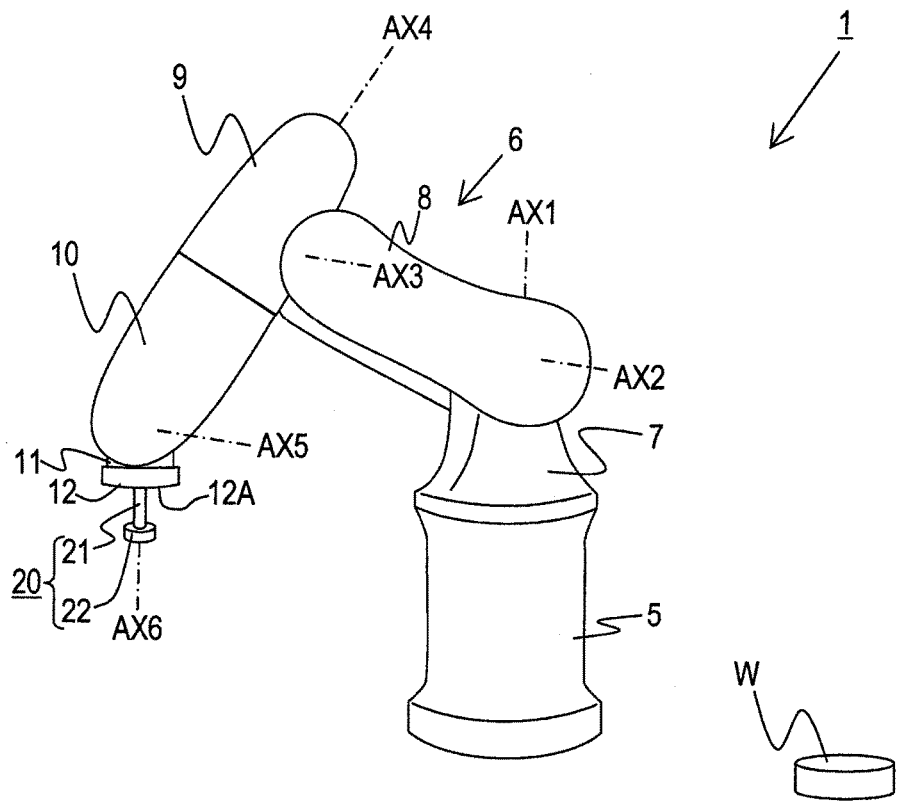
FIG. 1 is a schematic view showing a configuration of a robot, which has an operation advance indication apparatus according to a first embodiment.

An operation advance indication apparatus will be described below with reference to embodiments shown in the drawings.

[1. First Embodiment]
[1-1. Configuration]

Referring to FIG. 1, a robot 1 is configured as a vertical multi-joint robot having six axes. The robot 1 has a manipulator 6 attached to a base, that is, base link 5, which is fixed to an installation surface such as a floor of a factory. The manipulator 6 is configured with a shoulder 7, a lower arm 8, a first upper arm 9, a second upper arm 10, a wrist arm 11 and a flange 12, which are linked in sequence by first to sixth rotary joints (not shown). In FIG. 1, the first to sixth rotary joints are designated as first axis AX1 to sixth AX6, respectively.

That is, the shoulder 7 is coupled to the base 5 by the first rotary joint to be swivelable in a horizontal direction about the first axis AX1. The lower arm 8 is supported at a top end part of the shoulder 7 by the second rotary joint to be swivelable in an up-down direction about the second axis AX2. The first upper arm 9 is supported at a longitudinal end part of the lower arm 8 by the third rotary joint to be swivelable in an up-down direction about the third axis AX3. The second upper arm 10 is supported at a longitudinal end part of the first upper arm 9 by the fourth rotary joint to be torsionally rotatable about the fourth axis AX4. The wrist arm 11 is supported at a longitudinal end part of the second upper arm 10 by the fifth rotary joint to be swivelable about the fifth axis AXS. The flange 12 is supported at a longitudinal end part of the wrist am 11 by the sixth rotary joint to be torsionally rotatable about the sixth axis AX6.

Although not shown, each rotary joint is provided with a conventional driving mechanism, which enables swiveling or torsional rotation by a servomotor or the like, and a torque sensor for detecting a torque applied to the rotary joint. The driving mechanism and the torque sensor are referred to as a robot driving part 14, which is shown in FIG. 2.

A variety of end effectors such as a gripper for gripping various work pieces are attachable to the flange 12. In the following description, it is assumed as one example that an end effector 20 for vacuum suction is attached to the flange 12. As shown in FIG. 1, the end effector 20 has a conventional configuration of a pipe 21 and a suction pad 22 attached to a longitudinal end of the pipe 21. The robot 1 operates to suck a work piece W placed or loaded on a floor of a factory by way of the suction pad 22 and transfer it to a different place, for example. Since it is conventional that the pipe 21 includes therein tubes and the like for applying vacuum pressure in the suction pad 22, those component parts are not shown in FIG. 1.

Figure 4:
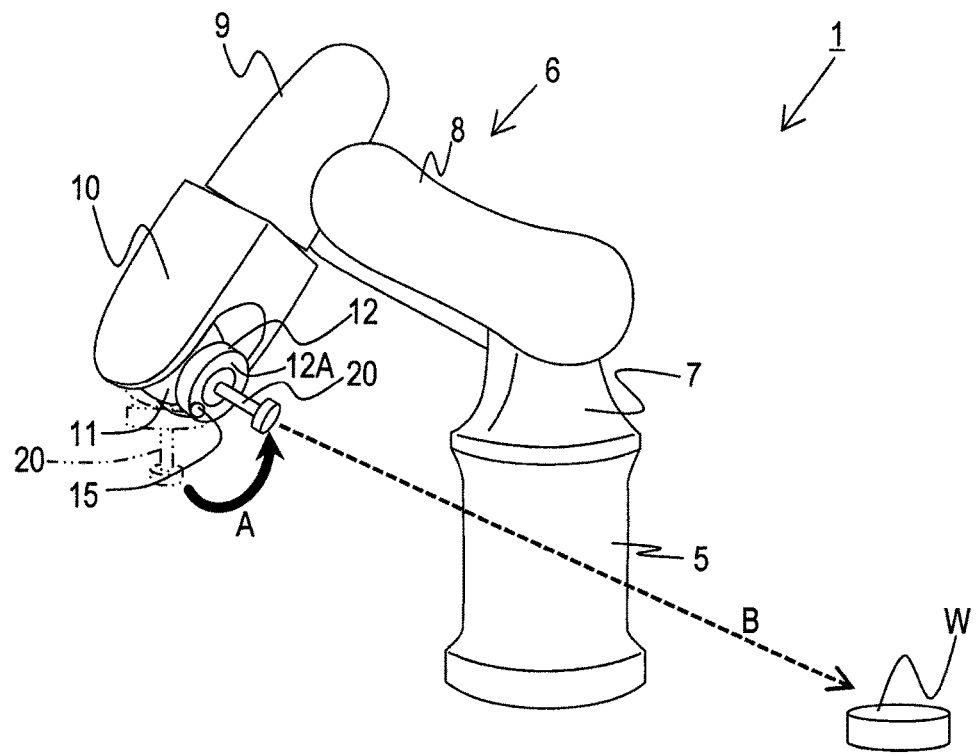
FIG. 4 is a schematic view showing a direction indication operation of the operation advance indication apparatus.

The flange 12 has an end surface 12A as a surface, to which various end effectors such as the end effector 20 is attached. As shown in FIG. 4, a camera 15 is attached to the end surface 12A so that the camera 15 takes an image of an area existing in an end direction of the end effector 20.

Figure 2:
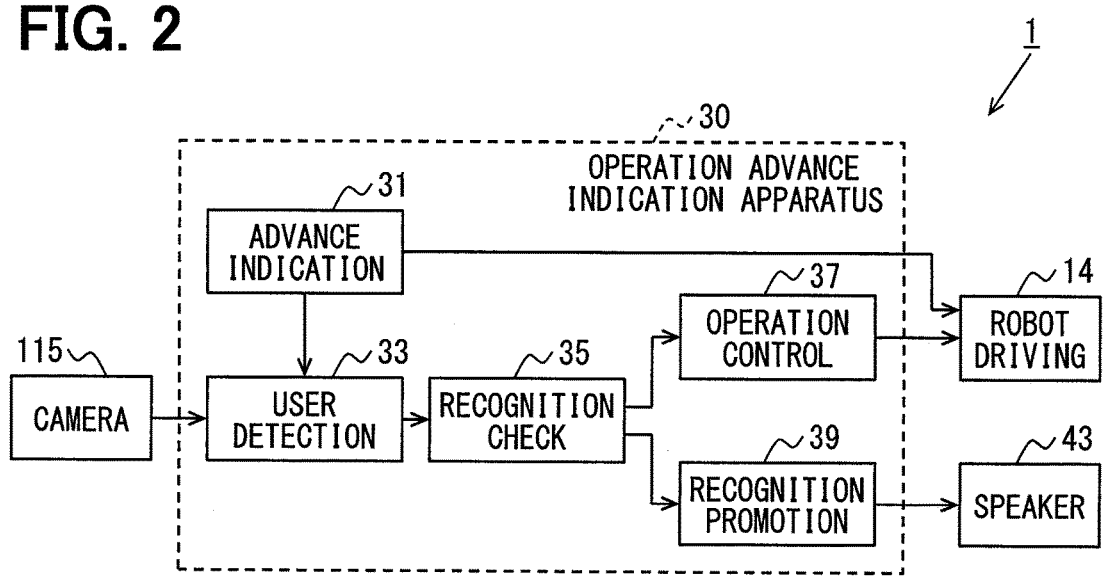
FIG. 2 is a block diagram showing a detailed configuration of the operation advance indication apparatus according to the first embodiment.

As shown in FIG. 2, the robot 1 additionally has an operation advance indication apparatus 30 and a speaker 43. The operation advance indication apparatus 30 and the speaker 43 may be located inside the robot 1, for example, inside the base 5, or may be located outside the robot 1 and connected to the robot 1 by way of signal lines or radio communication.

The operation advance indication apparatus 30 is configured with a conventional microcomputer as a main component part, which includes a CPU, a RAM, a ROM and a semiconductor memory such as a flash memory. Each function of the operation advance indication apparatus 30 is realized and performed by the CPU, which executes programs stored in the semiconductor memory. The operation advance indication apparatus 30 may be configured by one microcomputer or plural microcomputers.

The functions performed by the CPU by program execution are represented as an advance indication part 31, a user detection part 33, a recognition check part 35, an operation control part 37 and a recognition promotion part 39 as shown in FIG. 2. The functions of the operation advance indication apparatus 30 may be performed by software or a part or all of the functions of the same may be performed by hardware, which is a combination of logic circuits and analog circuits.

The advance indication part 31 makes an advance indication of its next operation in accordance with a work program or a command supplied to the robot 1. Specifically, as described later, the next operation of the robot 1 is notified by commanding it to the robot driving part 14 and driving the manipulator 6. When the operation advance indication part 31 makes an advance indication, the user detection part 33 detects a user of the robot 1, who is present in an area of movement of the manipulator 6 as a detected user, based on a picture image taken by the camera 15. The area of movement is shown as E exemplarily in FIG. 5 and will be described later. When the user is detected by the user detection part 33, the indication recognition part 35 checks whether the user has recognized the advance indication made by the operation advance indication part 31.

Based on a determination result of the indication recognition part 35, the operation control part 37 controls the operation of the manipulator 6 to be performed. When the indication recognition part 35 determines that the user has not recognized the advance indication, the recognition promotion part 39 promotes user's recognition to the advance indication or the movement of the manipulator 6.

[1-2. Processing]

Operation advance indication processing, which the operation advance indication apparatus 30 executes will be described with reference to a flowchart of FIG. 3. When the work program or command, which commands the manipulator 6 to move, is applied to the robot 1, the CPU of the operation advance indication apparatus 30 executes processing shown in FIG. 3 based on the program stored in the memory of the operation advance indication apparatus 30.

In this processing, at S1 (S indicates a step), processing for indicating a direction of a next working position in advance is executed. The direction is indicated in the processing at S1 by generating the command to the robot driving part 14 and directing the end surface 12A of the flange 12 in the direction toward the next working position. In a case that the next work piece Which the robot 1 performs, is to suck a work piece W by the end effector 20, the next working position is the position, where the work is located. In this situation, the wrist arm 11 is moved as shown by an arrow A in FIG. 4 and the end surface 12A is directed toward the work piece W. Thus, as shown by an arrow B, the direction of position of the work piece W is indicated as the next working position. As a result, it is notified that the manipulator 6 will move in the direction of arrow B. This processing of S1 corresponds to the operation advance indication part 31.

Figure 3:
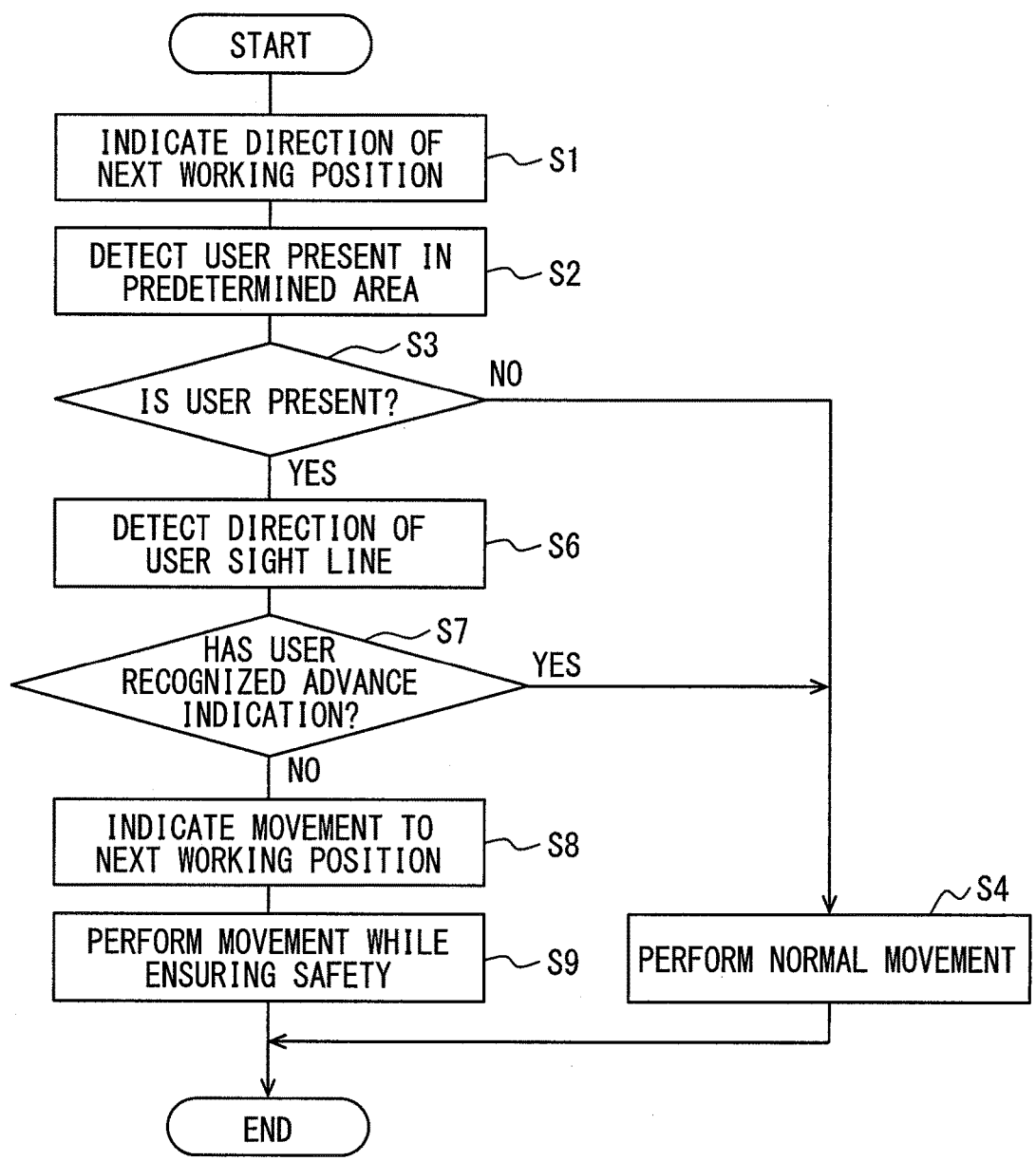
FIG. 3 is a flowchart showing operation advance indication processing performed by the operation advance indication apparatus shown in FIG. 2.
Figure 5:
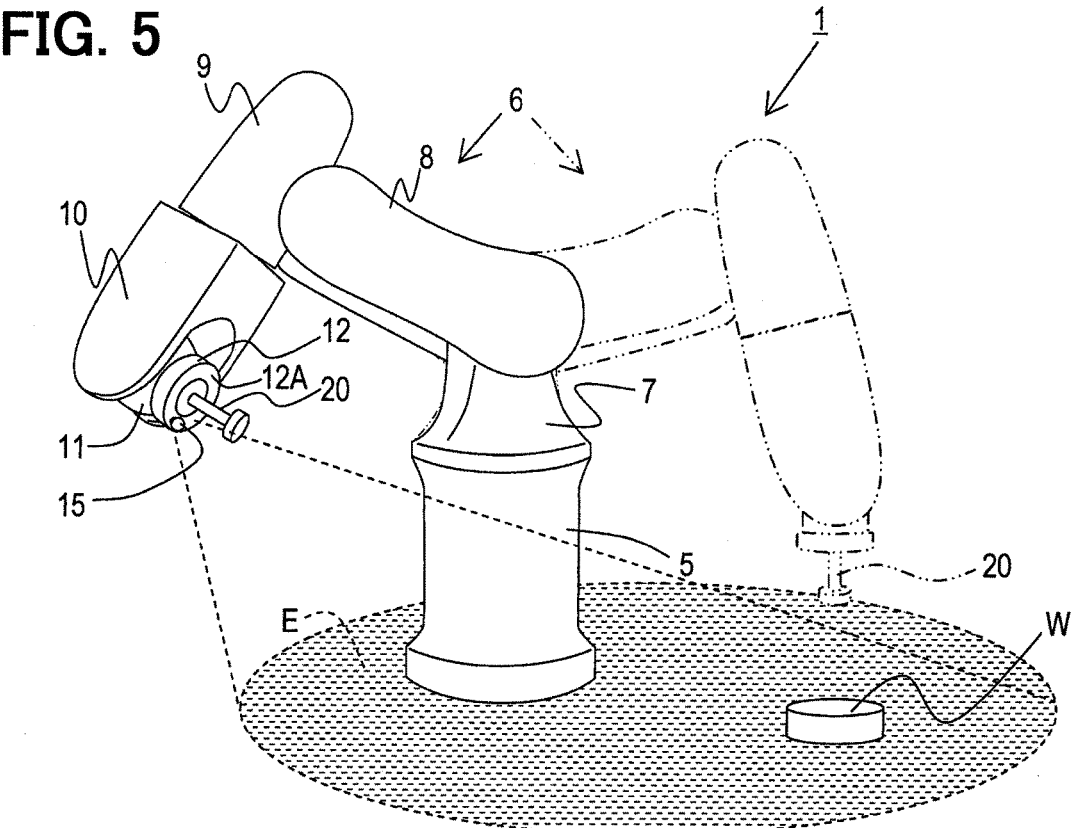
FIG. 5 is a schematic view showing a user detection operation in the operation advance indication processing.

At S2 in FIG. 3, processing of detecting a user present in a surrounding area along a direction toward the next working position. At this processing of S2, as shown in FIG. 5 exemplarily, it is detected whether a user is present in the area E, in which the manipulator 6 moves when the manipulator 6 moves to the working position. Since the end surface 12A of the flange 12 is directed toward the next working position by the processing of S1 as described above, the processing of S2 is executed by analyzing the picture image taken by the camera 15 provided at the end surface 12A of the flange 12.

The processing of S2 corresponds to the user detection part 33. In the processing of S2, a user who is near the area is also detected, because the user who is a little outside of the area of movement of the manipulator 6 will potentially enter the area and touch the manipulator 6.

At subsequent S3 in FIG. 3, it is checked whether a user is detected in the area based on the detection result of processing of S2. When the user is not detected (S3: NO), processing of S4 is executed. In S4, the manipulator 6 is moved normally thereby finishing the routine. That is, at S4, a command is sent to the robot driving part 14 and the manipulator 6 is driven to thereby move the flange 12 to the next working position at a predetermined normal speed. For example as shown by an arrow C in FIG. 6, the flange 12 is moved to a position, which is above the work piece W, as the next working position.

The processing of S4 corresponds to the operation control part 37. It is also allowable to continuously indicate the direction toward a position of a work as the next working position by directing the end part 12A of the flange 12 toward the work piece W as shown by the arrow B during the movement performed by the processing of S4.

When the user is detected by the processing of S3 (S3: YES), processing of S6 is executed next. At S6, a sight line of the user is detected by way of camera 15. It is also allowable in execution of the processing of S6 to change the image-taking direction of the camera 15 for taking an image of user's eyes by temporarily changing the direction of the wrist arm 11 or the flange 12 as the case may be.

At S7, it is checked based on the sight line of the user detected in S6 whether the user recognized the advance indication of direction performed by the processing of S1, that is, the advance indication of next movement of the manipulator 6. For example, at S7, it is checked whether the user has recognized the advance indication based on whether the user gazed at the manipulator 6 for a predetermined period. When the user has recognized the advance indication (S7: YES), the processing returns to S4. When the user has not recognized (S7: NO), S8 is executed. The processing of S6 and S7 corresponds to the indication recognition part 35.

At S8, it is indicated that the manipulator 6 moves to the next working position. For example, the speaker 43 is driven to generate predetermined sound tone, musical scale or word to indicate that the advance indication has been made and the manipulator 6 will move to the next working position. The processing of S8 corresponds to the recognition promotion part 39.

In the subsequent processing of S9, the manipulator 6 is moved safely thereby finishing the routine. At S9, a command is sent to the robot driving part 14 and the manipulator 6 is driven so that the flange 12 is moved to the next working position at a speed, at which the manipulator 6 is stopped in an emergency when the user happens to touch the manipulator 6. It is known well in the art to stop the manipulator 6 in an emergency when the user touches the manipulator 6 operating below a certain speed and applies an abnormal torque. The speed of movement of the manipulator 6 driven by the processing of S9 is lower than that of the manipulator 6 driven by the processing of S4. The processing of S9 corresponds to the operation control part 37.

Figure 6:
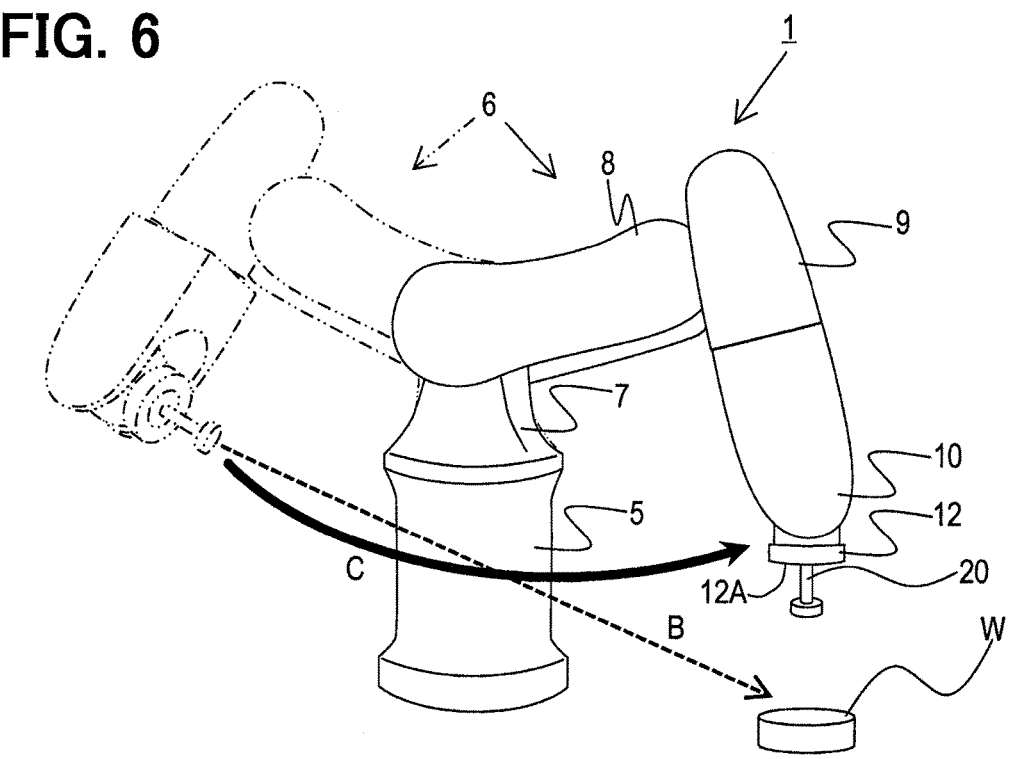
FIG. 6 is a schematic view showing a movement operation in the operation advance indication processing.

When the manipulator 6 continues to move by the processing of S9, it is desirable to continue to indicate the direction of position, at which the work piece W is loaded, as the next working position as shown exemplarily by the arrow B in FIG. 6 by directing the end surface 12A of the flange 12 toward the work piece W during the movement of the manipulator 6. The indication by sound performed by the processing of S8 may be continued during a period of movement of the manipulator 6 driven by the processing of S9.

[1-3. Advantage]

The first embodiment described above provides the following advantages.

(1A) In the first embodiment, the movement of the manipulator 6 is indicated (S1) before its movement. However, the user may miss the advance indication occasionally. Even in such a case (S7: NO), the speaker 43 is driven to promote the user to recognize that the advance indication has been made and the manipulator 6 is moving (S8). It is thus possible to help the user to recognize the movement of the manipulator 6. In the first embodiment, therefore, the safety of the robot is improved.

(1B) When the user has not recognized the advance indication (S7: NO), the manipulator 6 is driven to move at a predetermined lower speed lower than the normal speed performed when the user has recognized it. The predetermined lower speed is set to enable the manipulator 6 to make an emergency stop. In the first embodiment, the safety of the robot 1 is improved further.

(1C) In the first embodiment, it is checked whether the user has recognized the advance indication based on whether the user has viewed the manipulator 6. Since the user therefore need not take any special actions to notify the indication recognition part 35 of the recognition of the advance indication, operability of the robot 1 is improved.

(1D) In the first embodiment, the movement of the manipulator 6 is indicated by directing the end surface 12A of the flange 12 toward the next working position. Since the user is thus enabled to recognize the direction of movement of the manipulator 6 instantly, the safety of the robot 1 is improved further. Since the advance indication is performed without voice sound, the user is released from being annoyed by the voice sound.

(1E) Since the end surface 12A is controlled to continue the advance indication toward the next working position when the user has not recognized the advance indication (S7: NO), the user is enabled to recognize the direction of movement of the manipulator 6 even in a midst of movement of the manipulator 6. Thus the safety of the robot 1 is improved further.

(1F) In the first embodiment, when the user has not recognized the advance indication (S7: NO), voice sound is generated to promote the user to recognize that the advance indication has been made and the manipulator 6 will move to the next working position. It is thus possible to promote the recognition of the user more effectively than promoting it by, for example, only the operation of the manipulator 6. The safety of the robot 1 is improved further.

(1G) When the next working position is indicated by light projection only to the user, the projected light becomes hardly recognized because of ambient light or a light projector may have to be provided on the manipulator 6. The light projector tends to restrict the movement of the manipulator 6. In the first embodiment, since the end surface 12A is directed to cause the user to recognize the next working position, influence of the ambient light or restriction on operation of the manipulator is reduced.

In the first embodiment, the manipulator 6 corresponds to a movable part and the end surface 12A of the flange 12 corresponds to a part, which is capable of indicating a direction.

[2. Second Embodiment]

[2-1. Difference from First Embodiment]

A second embodiment is configured substantially similarly to the first embodiment but different from that in the following points.

Figure 7:
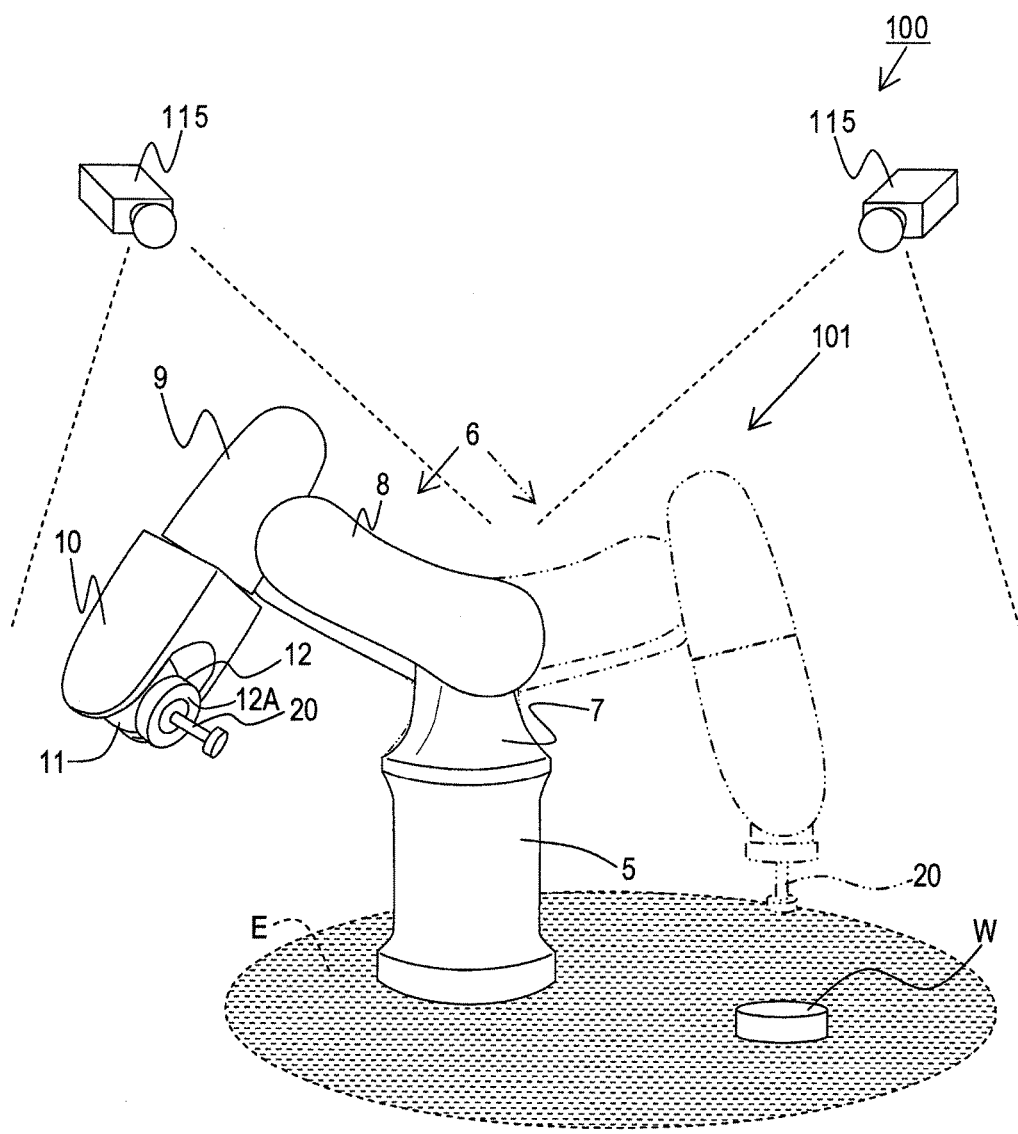
FIG. 7 is a schematic view showing a configuration of a robot, which has an operation advance indication apparatus according to a second embodiment.
Figure 8:
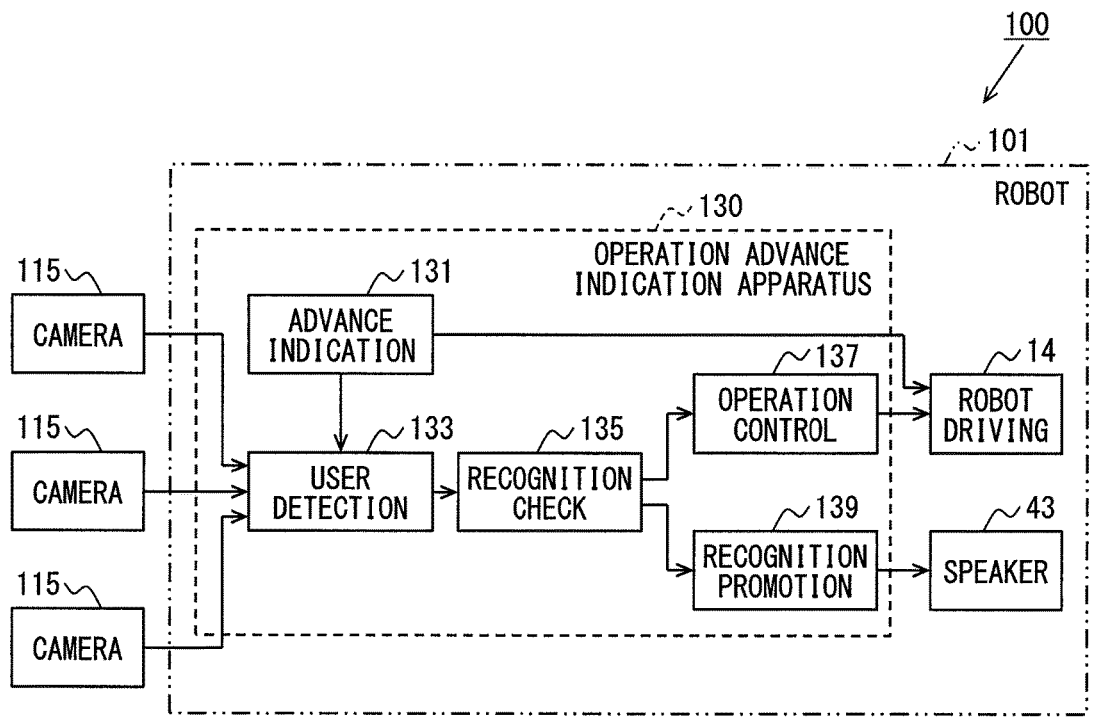
FIG. 8 is a block diagram showing a detailed configuration of the operation advance indication apparatus according to the second embodiment.

In the first embodiment described above, the camera 15 is provided on the flange 12 of the manipulator 6 to detect a user. A robot system 100 in the second embodiment is different from the first embodiment in that, as shown in FIG. 7, it is configured with a robot 101 and plural cameras 115, which are attached to a ceiling of a factory, for example, to detect a user. As shown in FIG. 7, the plural cameras 151 are provided to detect a user, who is present in the area of movement of the manipulator 6.

The robot 101 is configured similarly to the robot 1 of the first embodiment except for the camera 14. An operation advance indication apparatus 130 of the robot 101 includes the operation advance indication part 31 and the operation control part 37, which are the same as those in the first embodiment, an advance indication part 131, which is similar to the recognition promotion part 39, a recognition check part 135, an operation control part 137 and a recognition promotion part 139. The operation advance indication apparatus 130 according to the second embodiment is different from the user detection part 33 of the first embodiment in that the user detection part 133 detects a user in the area E, in which the manipulator 6 moves, based on picture images taken by plural cameras 151. The recognition check part 135 also detects a direction of sight line of a user based on the picture images taken by the cameras 151.

[2-2. Processing]

Operation advance indication processing executed in the second embodiment is generally similar to the operation advance indication processing shown in FIG. 3 and executed in the first embodiment. It is different, however, in that the user detection at S2 and sight line detection at S6 are executed by using plural cameras 151.

[2-3. Advantage]

The second embodiment described above provides the following advantages in addition to the advantages (1A) to (1G) of the first embodiment described above.

(2A) In the second embodiment, the user and his or her sight line are detected by using the cameras attached to the ceiling or the like of the factory. It is thus possible to improve each accuracy of detection of the user and the sight line of the user. As a result, it is possible to prevent the manipulator 6 from being driven at the normal speed in the processing of S4 when the user does not recognize the advance indication. Further, it is possible to prevent generation of the voice sound in the processing of S8 when the user has already recognized the advance indication.

[3. Third Embodiment]

[3-1. Difference from First Embodiment and Second Embodiment]

A third embodiment is different from the first embodiment and the second embodiment in S9 and subsequent processing in operation advance indication processing. Mechanical configuration and processing of S1 to S8 are the same as any one of the first embodiment and the second embodiment.

Figure 9:
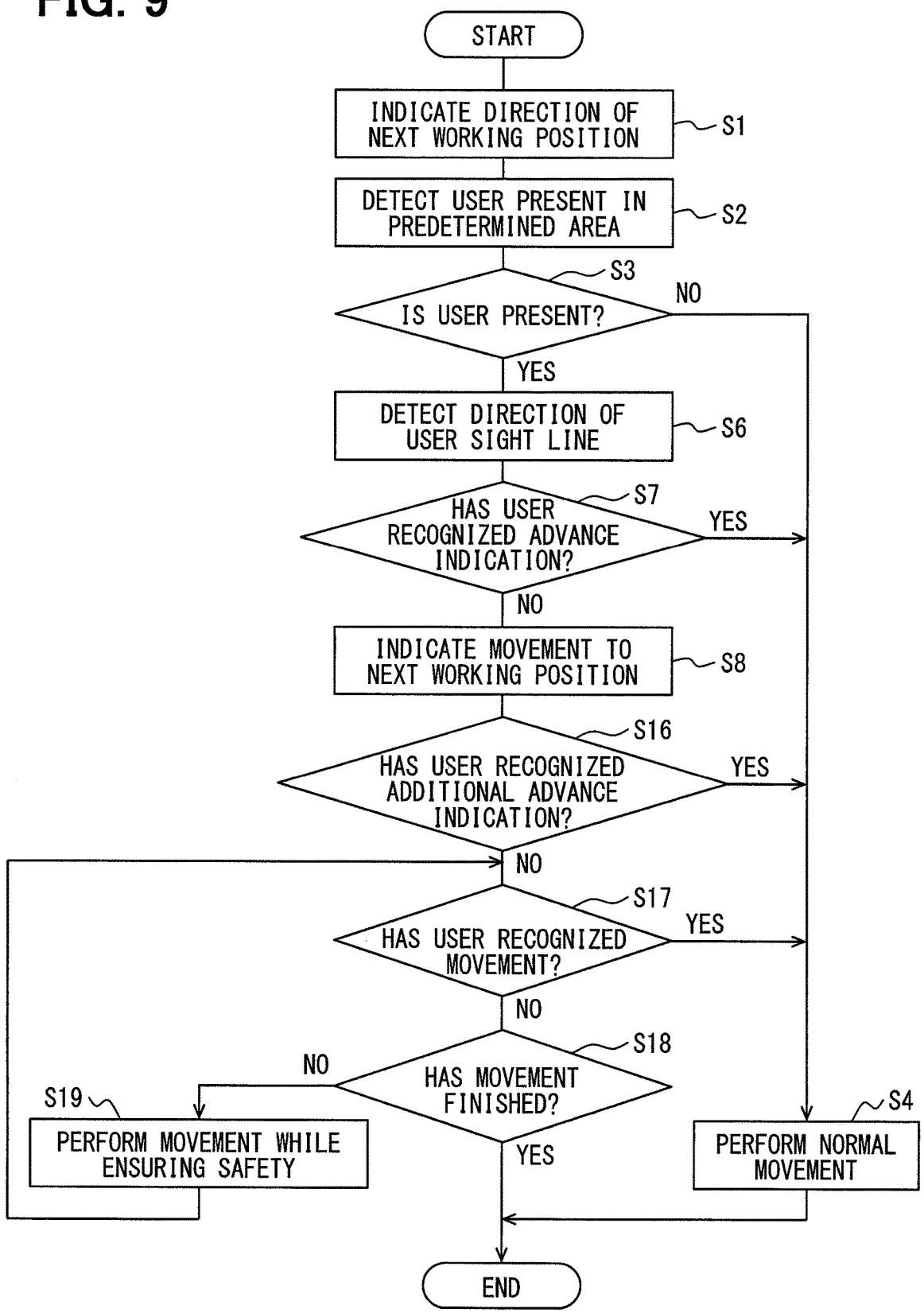
FIG. 9 is a flowchart showing operation advance indication processing performed by the operation advance indication apparatus shown in FIG. 8.

As shown in FIG. 9, when it is indicated by way of the speaker 43 by the processing of S8 that the advance indication of movement of the manipulator 6 to the next working position has been made and the manipulator will move to the next working position, processing of S16 is executed. At S16, it is checked in the same way as S6 and S7 whether the user has recognized the advance indication made at S8, that is, additional advance indication. The additional advance indication means an advance indication, which is a second advance indication or plural advance indications following the first advance indication. When the user has recognized the additional indication (S16: YES), the processing moves to S4 described above.

When the user has not recognized the additional indication (S16: NO), the processing moves to S17. At S17, it is checked whether the user has recognized the movement of the manipulator 6 by detecting the direction of sight line of the user. When the user has recognized the manipulator 6 (S17: YES), the processing moves to S4 described above. When the user has not recognized the manipulator 6 (S17: NO), the processing moves to S18. At S18, it is checked whether the manipulator 6 has completed its movement. When the manipulator 6 has completed its movement (S18: YES), the routine is finished. When the manipulator 6 has not completed its movement yet (S18: NO), the processing moves to S19. At S19, similarly to S9, the manipulator 6 is moved while ensuring safety and the processing is moved to S17 described above.

[3.3 Advantage]

The third embodiment described above provides following advantages in addition to the advantages (1A) to (1G) of the first embodiment or the advantages (1A) to (1G) and (2A) of the second embodiment.

(3A) In the third embodiment, when the user has recognized the additional indication provided by the processing of S8 (S16: YES), the manipulator 6 is moved at a normal speed by the processing of S4. When the user has not recognized the additional indication (S16: NO), the manipulator 6 is moved at a low speed to ensure safety. However, even during the period of slow movement (S18: NO), it is checked repeatedly whether the user has recognized the movement of the manipulator 6 by the processing of S17 until the movement is completed (S18: YES). When the user has recognized the movement of the manipulator 6 (S17: YES), the normal movement is performed by the processing of S4.

As a result, when the user has recognized the additional indication or the movement of the manipulator 6 and hence the safety is ensured (S16: YES or S17: YES) even at the movement of the manipulator 6 at the normal speed, the manipulator 6 is driven to move at the normal speed by the processing of S4. In the third embodiment, it is possible to improve the working efficiency of the robot 1 or 101.

[4. Other Embodiment]

The operation advance indication apparatus is not limited to the embodiments described above but may be implemented in different embodiments.

(4A) In the embodiments, the user is detected based on the picture image taken by the camera 15 or 115. However, without being limited to this, the user may be detected in various ways. For example, the camera 15 or 115 may be an infrared camera. The user may be detected by a laser sensor attached to the robot 1. Further, the user may be detected based on conversation sound or user operation sound, which is detected by a microphone provided in a robot operation environment or attached to the robot 1. The user may be detected by a temperature sensor, thermography or $CO_2$ sensor provided in a robot operation environment or attached to the robot 1. The user may be detected based on a mobile terminal or an IC tag, which is carried by the user to transmit a predetermined radio wave. The user detection methods exemplified above may be used in combination.

(4B) In the embodiments described above, the user is detected in the area E, in which the manipulator 6 moves. However, the user may be detected in a wider area such as an entire room, in which the robot 1, 101 is installed.

(4C) In the embodiments described above, the operation advance indication part 31, 131 made the advance indication by directing the end surface 12A of the flange 12, to which the end effector 20 is attached, toward the direction of movement of the flange 12. However, in a case that a robot to be controlled is a human type robot, the advance indication part 31, 131 may perform the advance indication of the direction of movement by driving the robot 1, 101 to make a finger pointing motion. In a case that the robot 1, 101 has a face, the advance indication part 31, 131 may indicate the direction of movement by driving the robot 1, 101 to direct the sight line of the robot 1, 101 or direct an entire head part of the robot 1, 101. The sight line may be a direction, in which a part corresponding to an eye such as a camera is attached.

(4D) The advance indication part 31, 131 may indicate the direction of movement of the movable part by moving the entire movable part such as the manipulator 6 or the entire movable part without using a part such as the end surface 12A, finger, eye or head part, which is capable of indication a direction.

(4E) The advance indication part 31, 131 may indicate the direction of movement of the movable part by directing a display surface of a display device such as a liquid crystal display mounted on the robot 1, 101 toward the direction of movement.

(4F) The advance indication part 31, 131 may indicate the direction of movement of the movable part by displaying characters or image pictures on a display device such as a liquid crystal display. In this case, the display device need not be fixed to the robot 1, 101. A mobile terminal such as a tablet may be used to function as the display device by placing the terminal at a position, at which the display device is capable of communication with the robot 1, 101. In this case, the terminal may be installed around the robot 1, 101 or carried by a user. In the latter case, the advance indication part 31, 131 is capable of performing the advance indication by display to only the terminal of the user, who is present around the robot. The terminal and the advance indication part 31, 131 may communicate by radio wave or communication line.

(4G) The advance indication part 31, 131 may indicate the direction of movement of the movable part by generating sound or word. The advance indication part 31, 131 may generate sound or words, which varies with various situations such as required level of caution in addition to the direction of movement of the movable part.

(4H) The advance indication part 31, 131 may indicate the direction of movement of the movable part by controlling a part of a casing of the robot 1, 101 to light. Lighting of the part of the casing of the robot may be attained by LEDs or the like provided on the casing of the robot 1, 101, for example. The advance indication part 31, 131 may control the part of the casing of the robot 1, 101 to light in not only the direction of movement but also in a color, which varies with various situations such as required level of caution.

(4I) The advance indication part 31, 131 need not always indicate the movement of direction of the movable part but may simply indicate that the movable part will make a certain operation. In this case, the advance indication part 31, 131 may generate predetermined tone, musical scale or word. In a case that the advance indication part 31, 131 indicates simply that the movable part will make a certain operation, the advance indication part 31, 131 may light a particular part of the casing of the robot 1, 101 irrespectively of the movement of movable part. In a case that the advance indication part 31, 131 indicates simply that the movable part will make a certain operation, the advance indication part 31, 131 may perform the advance indication by blowing wind at a predetermined wind quantity to the user present around the movable part. In a case that the advance indication part 31, 131 indicates simply that the movable part will make a certain operation, the advance indication part 31, 131 may perform the advance indication by radiating an ultrasonic wave of a predetermined wavelength to the user present around the movable part to appeal to tactile sense of the user.

In a case that the advance indication part 31, 131 indicates simply that the movable part will make a certain operation, the advance indication part 31, 131 may perform the advance indication by blowing cold wind or hot wind of a predetermined temperature to the user present around the movable part to appeal to temperature sense of the user. In a case that the advance indication part 31, 131 indicates simply that the movable part will make a certain operation, the advance indication part 31, 131 may generate flavor, which improves alertness level of the user present around the movable part to appeal to sense of smell of the user. In a case that the advance indication part 31, 131 indicates simply that the movable part will make a certain operation, the advance indication part 31, 131 may generate flavor, which improves level of recognition of the user present around the movable part to appeal to sense of smell of the user. The operation of advance indication exemplified in (4I) may include notification of caution level by strength of light, sound, wind or wind.

(4J) The operations of advance indications exemplified as (4C) to (4I) may be performed in a combined manner. The operations of advance indications exemplified as (4C) to (4I) may be performed as an operation of the recognition promotion part. That is, the operations of advance indications exemplified as (4C) to (4I) may be performed as the additional advance indication of S8.

(4K) The operation control part 37, 137 need not necessarily be provided. The recognition promotion part may only promote the recognition of the user when the user does not recognize the advance indication of the advance indication part and the movement of the movable part. This embodiment will also provide the advantage of (1A) described above.

(4L) In each embodiment described above, the operation control part 37, 137 slows down the speed of movement of the manipulator 6, which is the movable part, when the user has not recognize the advance indication of the advance indication part 31, 131 nor the movement of the manipulator 6. Without being limited to this example, the operation control part 37 may reduce a radius of rotation of the movable part, when the user has not recognized the advance indication of the advance indication part 31, 131 nor the movement of the manipulator 6. Further, the operation control part 37 may maintain the movable part in a stop state and repeat the additional advance indication until the user recognizes the additional advance indication, which is made as the operation of the recognition promotion part 39, 139 when the user has not recognized the advance indication of the advance indication part 31, 131 nor the movement of the manipulator 6.

(4M) In each embodiment described above, the recognition check part 135 checked whether the user has recognized the advance indication based on the sight line of the user. Without being limited to this example, the recognition check part 135 may check whether the user has recognized the advance indication based on a facial expression or behavior of the user. A camera or other sensors for detecting the sight line, facial expression or behavior of the user may be worn by the user. The other sensors may be any one of various types of sensors. For example, a sensor for electrically detecting a movement of muscle, for example.

The recognition check part 135 may check whether the user has recognized the advance indication based on whether the user has responded in response to the advance indication. This response may be any one of various actions or the like. For example, the user may respond to the advance indication by orally generating "OK" or by operating a button or touch panel of a mobile terminal.

(4N) The function of each structural element performed in each embodiment may be divided into plural structural elements or the functions of plural structural elements may be integrated into one structural element. The structure of each embodiment may be eliminated partly. At least a part of the structure of one embodiment may be added to or replaced with the structure of other embodiments.

(4O) The operation advance indication apparatus may be implemented in various forms such as a system including the operation advance indication apparatus, a program for operating a computer as the operation advance indication apparatus and a storage medium storing the program.

What is claimed is:

1. An operation advance indication apparatus attached to a robot, which has a movable part, for indicating an operation of the robot, the operation advance indication apparatus comprising:
    an advance indication part for indicating an operation of a robot in advance, by using the movable part, by indicating a direction in which the movable part is driven to move next;
    a user detection part for detecting a user present inside a predetermined area, in which the movable part moves to perform the operation;
    a recognition check part for checking whether a detected user has recognized the advance indication, based on whether the detected user has gazed at the movable part, when the user detection part has detected the user;
    a recognition promotion part for promoting a recognition of the detected user about the advance indication or about the operation of the robot, when the recognition check part determines that the detected user has not recognized the advance indication; and an operation control part that (i) controls an operation of the movable part at time of the operation of the robot based on a check result of the recognition check part, (ii) restricts the operation of the movable part, when the recognition check part determines that the detected user has not recognized the advance indication, and (iii) controls the movable part to move at a lower speed, when the recognition check part determines that the detected user has not recognized the advance indication, the lower speed being lower than that of a case that the recognition check part determines that the detected user has recognized the advance indication.

2. The operation advance indication apparatus according to claim 1, wherein:

the movable part has a predetermined part, which is capable of indicating a direction of movement; and the advance indication part indicates a direction of next movement of the movable part by directing the predetermined part to the direction of next movement.

3. The operation advance indication apparatus according to claim 2, further comprising:

an operation control part for controlling the operation of the movable part at the time of operation based on the check result of the recognition check part; and the operation control part controls the movable part so that the predetermined part always faces the direction of next movement at time of moving the movable part, when the recognition check part determines that the detected user has not recognized the advance indication.

4. The operation advance indication apparatus according to claim 1, wherein:

the recognition promotion part promotes the recognition of the detected user by generating voice sound.

* * * * *